(12) United States Patent
Quan

(10) Patent No.: US 9,080,685 B2
(45) Date of Patent: Jul. 14, 2015

(54) DOUBLE-SWITCHED AUTOMATIC SPRINKLER VALVE

(71) Applicant: Tianbaili new technology development Co., Ltd., Beijing (CN)

(72) Inventor: Longhao Quan, Beijing (CN)

(73) Assignee: Tianbaili new technology development Co. Ltd, Beijing (CN)

( * ) Notice: Subject to any disclaimer, the term of this patent is extended or adjusted under 35 U.S.C. 154(b) by 350 days.

(21) Appl. No.: 13/761,786

(22) Filed: Feb. 7, 2013

(65) Prior Publication Data

US 2013/0200282 A1 Aug. 8, 2013

(30) Foreign Application Priority Data

Feb. 7, 2012 (CN) .......................... 2012 1 0025268

(51) Int. Cl.
| | |
|---|---|
| F16K 31/08 | (2006.01) |
| F16K 31/385 | (2006.01) |
| A62C 37/16 | (2006.01) |
| A62C 35/68 | (2006.01) |
| A62C 37/21 | (2006.01) |

(52) U.S. Cl.
CPC .................. *F16K 31/08* (2013.01); *A62C 35/68* (2013.01); *F16K 31/086* (2013.01); *F16K 31/3855* (2013.01); *A62C 37/16* (2013.01); *A62C 37/21* (2013.01)

(58) Field of Classification Search
CPC ... F16K 31/08; F16K 31/086; F16K 31/3855; A62C 37/16; A62C 37/21; A62C 35/68
USPC ............ 251/65, 11, 28, 30.01–30.04; 137/80; 169/19; 239/75, 569, 583, 586
See application file for complete search history.

(56) References Cited

U.S. PATENT DOCUMENTS

| | | | | |
|---|---|---|---|---|
| 1,594,897 | A * | 8/1926 | Trotter ............................ | 169/37 |
| 3,205,675 | A * | 9/1965 | Matthies ........................ | 62/202 |
| 3,212,751 | A * | 10/1965 | Hassa .............................. | 251/65 |
| 4,325,217 | A * | 4/1982 | Golestaneh .................... | 60/527 |
| 4,390,157 | A * | 6/1983 | Meckstroth ............... | 251/30.02 |
| 4,523,605 | A * | 6/1985 | Ohkata ........................... | 137/62 |
| 4,706,758 | A * | 11/1987 | Johnson ........................ | 169/19 |
| 4,836,496 | A * | 6/1989 | Abujudom et al. ............ | 251/11 |
| 5,169,117 | A * | 12/1992 | Huang ....................... | 251/30.03 |
| 5,211,371 | A * | 5/1993 | Coffee ........................... | 251/11 |
| 5,494,113 | A * | 2/1996 | Polan ............................ | 169/37 |
| 5,758,863 | A * | 6/1998 | Buffet et al. .................... | 251/28 |
| 6,073,904 | A * | 6/2000 | Diller et al. ................ | 251/30.03 |
| 6,102,127 | A * | 8/2000 | Pierce ............................ | 169/37 |
| 7,296,593 | B2 * | 11/2007 | Matsui et al. ................. | 137/597 |
| 2004/0051064 | A1 * | 3/2004 | Beraldo ..................... | 251/30.03 |
| 2010/0038569 | A1 * | 2/2010 | Li et al. ..................... | 251/129.03 |
| 2010/0212746 | A1 * | 8/2010 | Maercovich ..................... | 137/1 |

* cited by examiner

*Primary Examiner* — John K Fristoe, Jr.
*Assistant Examiner* — David Colon Morales

(57) ABSTRACT

A double-switched automatic sprinkler valve in a field of automatic controlling devices for cooling and fire fighting is disclosed. A memory alloy, sleeved outside a manual adjusting rod at an upper part of a valve lid, opens and closes a valve according to temperature changes. The valve can also be opened and closed by rotating the manual adjusting rod. A piston is provided within a valve body. A bias spring, provided at an internally upper part of a valve cover, has an upper part resisting against an internally upper part of the valve cover. A movable rod, a magnetic loop assembly and a magnetic loop sheath together are sleeved outside a piston barrel. The manual adjusting rod is rotated into a middle hole of the movable rod. A heat concentrating cover is connected to the manual adjusting rod via rotating.

18 Claims, 1 Drawing Sheet

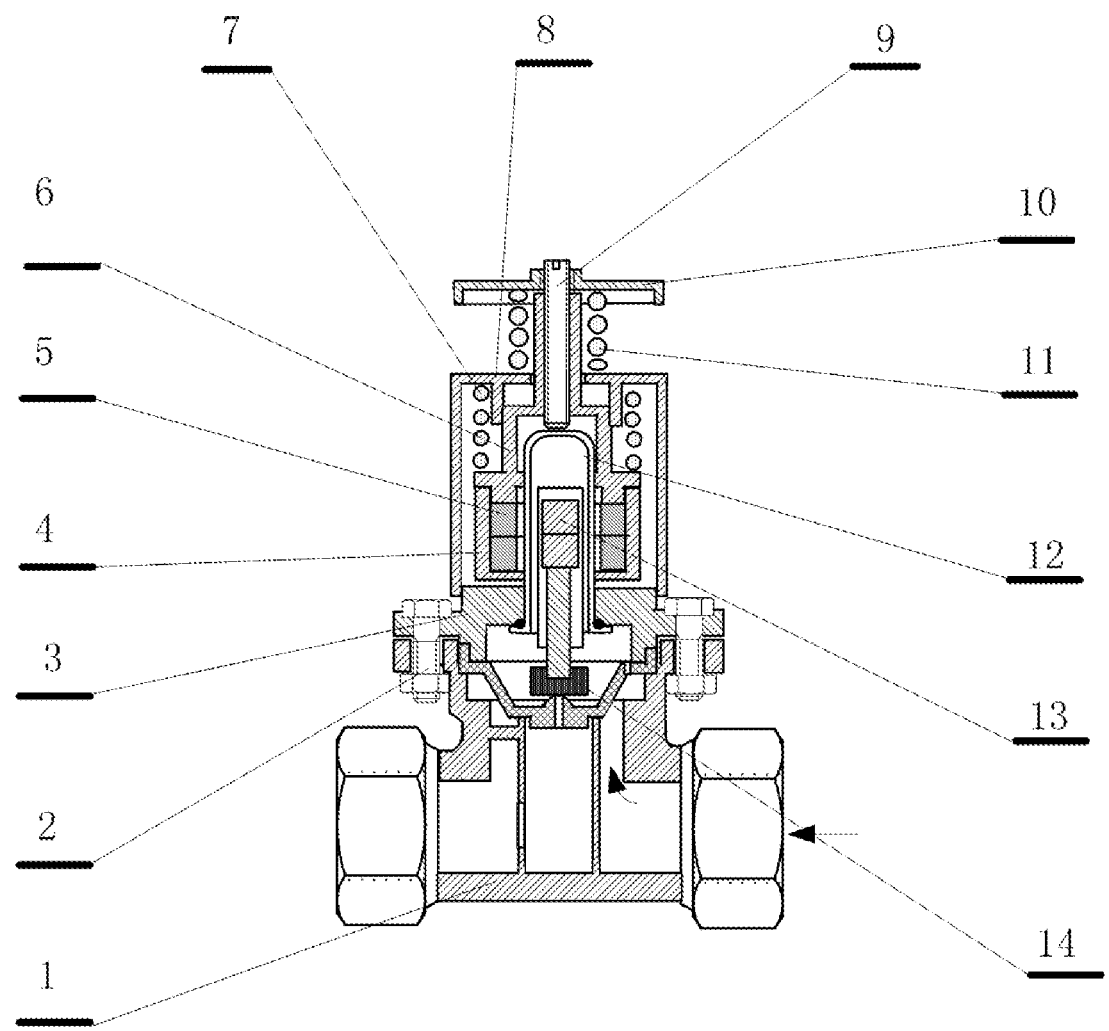

DOUBLE-SWITCHED AUTOMATIC SPRINKLER VALVE

BACKGROUND OF THE PRESENT INVENTION

1. Field of Invention

The present invention relates to a field of automatic controlling devices for cooling and fire fighting, and more particularly to a double-switched automatic sprinkler valve.

2. Description of Related Arts

In the conventional cooling and fire fighting system, the smoke ion sensor and the glass bubble spraying head are installed in the room and only applied in relatively superior buildings, such as hotels, restaurants and office buildings, because of high investment. When the indoor environment temperature rapidly increases, the organic solvent within the glass bubble spraying head evaporates to break the glass bubble and thus water for fire fighting communicated to the glass bubble sprinkles down, so as to restrain the spread of the fire. However, such a disposable device is unable to automatically cut off the water after the fire accident, not to mention automatically switching off the valve after the environment temperature decreases. As a result, the broken glass bubble still keeps sprinkling water down after the fire is put out, which causes a great waste of the valuable water resource and is very liable to cause flooding. Despite of abilities of automatically switching off and automatically sprinkling, another conventional technology named intelligent automatic fire fighting device still fails to automatically recover after fire accidents because opening or closing the valve requires electricity while most areas have no support of electricity or have the electric power damaged in the fire accidents. According to the above problems, the inventor disclosed a no-electricity automatic fire fighting sprinkler valve having a Chinese application number of 201010156537.9 and an intelligent fire fighting sprinkler having a Chinese patent number of 00209946.2. Although the two disclosed devices solve the above problems, it is found hard to manually open and close the valves in application when the valves need to be opened for overhaul or in special situations, which causes great inconvenience.

SUMMARY OF THE PRESENT INVENTION

An object of the present invention is to solve the above problems in the conventional arts and provide a fire fighting automatic sprinkler which is capable of automatically switching on and off water according to changes of an environment temperature and allowing a valve to be manually opened and closed according to practical needs.

Accordingly, in order to accomplish the above object, the present invention adopts following technical solutions. A double-switched automatic sprinkler valve comprises a valve and a temperature-controlling head, and mainly comprises a valve body, a valve lid, a piston provided within the valve body, a magnetic loop sheath, a magnetic loop assembly, a movable rod, a bias spring, a valve cover, a manual adjusting rod, a memory alloy, a heat concentrating cover, a piston barrel, a magnetic core assembly and a piston. The valve body has a cylindrical water outlet. The piston is provided at an upper end of the water outlet. The piston has a decompression hole and a small aperture intercommunicated with a water inlet of the valve body. The magnetic core assembly is inserted into the piston barrel and able to move upwardly and downwardly under effects of magnetic force lines of the magnetic loop assembly within the magnetic loop sheath. The magnetic loop sheath and the magnetic loop assembly are able to move upwardly and downwardly outside the piston barrel. The bias spring is sleeved outside the movable rod and an upper part of the bias spring resists against an internal upper part of the valve cover. The movable rod passes through an internally hexagon hole of a top of the valve cover to be connected to the manual adjusting rod on the heat concentrating cover. The manual adjusting rod is rotated up along threads of a middle hole of the movable rod to an upper end of the piston barrel. The memory alloy is sleeved into an outer part of the manual movable rod. The heat concentrating cover is connected via rotating to the threads on the manual adjusting rod. The magnetic loop assembly is formed by at least two magnets connected via identical polarities.

The present invention has following beneficial effects. The double-switched automatic sprinkler valve is not only able to open and close the valve according to the changes of the temperature, but also able to allow the valve to be manually opened and closed according to practical needs, which improves usage effects and an application range.

These and other objectives, features, and advantages of the present invention will become apparent from the following detailed description, the accompanying drawings, and the appended claims.

BRIEF DESCRIPTION OF THE DRAWINGS

The FIGURE is a sectional view of a double-switched automatic sprinkler valve according to a preferred embodiment of the present invention.

Therein 1—valve body; 2—valve lid connecting bolt; 3—valve lid; 4—magnetic loop sheath; 5—magnetic loop assembly; 6—movable rod; 7—bias spring; 8—valve cover; 9—manual adjusting rod; 10—heat concentrating cover; 11—memory alloy; 12—piston barrel; 13—magnetic core assembly; 14—piston.

DETAILED DESCRIPTION OF THE PREFERRED EMBODIMENT

Referring to FIG. 1 of the drawings, according to a preferred embodiment of the present invention, a double-switched automatic sprinkler valve is illustrated. A piston barrel 12 is inserted into a middle hole of a valve lid 3 from bottom to top to be welded with the valve lid 3 into a whole. A magnetic core assembly 13 is inserted into an internal cavity of the piston barrel 12 which forms with the valve lid 3 into a whole. A piston 14 is provided at correspondent positions inside a cavity of a valve body 1. By fixing the valve lid 3 which carries the piston barrel 12 and the magnetic core assembly 13 and the valve body 1 which carries the piston 14 together via a valve lid connecting bolt 2 into a whole, a valve is accomplished.

A magnetic loop assembly 5 is provided inside a cavity of a magnetic loop sheath 4. A movable rod 6 and the magnetic loop sheath 4 are connected via rotating into a whole while fixing the magnetic loop assembly 5 simultaneously. A bias spring 7 is sleeved onto the movable rod 6 from bottom to top. The movable rod 6 which carries the magnetic loop sheath 4, the magnetic loop assembly 5 and the bias spring 7 is inserted into a middle hole of a valve cover 8 from bottom to top. The valve cover 8 which carries the magnetic loop sheath 4, the magnetic loop assembly 5, the movable rod 6 and the bias spring 7 is fixed with the valve lid 3 via rotating, when an upper end of the bias spring 7 resists against a top of an inner cavity of the valve cover 8 and a lower end of the bias spring 7 resists against an upper end of the magnetic loop sheath 4; when the magnetic loop assembly 5 is located at a lower part of the piston barrel 12 under pressure of the bias spring 7, and the magnetic core assembly 13 within the piston barrel 12 is located at a lower part of the upper cavity of valve body 1 and blocks a decompression hole of the piston 14. When using, the valve is at a state of closing; a manual adjusting rod 9 is inserted into the middle hole of the movable rod 6 and then rotated into a desired position; a memory alloy 11 is sleeved at an outer part of the manual adjusting rod 9; and afterwards a heat concentrating cover 10 and the manual adjusting rod 9, connected via rotating, press against the memory alloy 11, so as to accomplish the double-switched automatic sprinkler valve.

In using, when an environment temperature is higher than a predetermined temperature, the memory alloy 11 expands to push the heat concentrating cover 10 upwardly to further drive the movable rod 6 and the magnetic loop assembly 5 upwardly, when the magnetic core assembly 13 within the piston barrel 12 also moves upwardly under magnetic forces, in such a manner that the decompression hole of the piston 14 is opened to reduce pressure within the internal upper cavity of the valve body 1 and thus the valve is at a state of opening. On the contrary, when the environment temperature decreases, the memory alloy 11 contracts and the magnetic loop assembly 13 moves downwardly to close the decompression hole of the piston 14; and thus the valve closes under pressure of inflow water.

In common situations, when the valve needs to be opened, the valve is opened only by rotating the manual adjusting rod 9, because the manual adjusting rod 9 resists against the upper part of the piston barrel 12 while moving downwardly when rotating the manual adjusting rod 9, as a result of the externally hexagonal movable rod 6 and the internally hexagonal middle hole of the upper part of the valve cover 8 the magnetic loop sheath 4, and thus the magnetic loop assembly 5 and the movable rod 6 are only able to move upwardly and downwardly. In practical application, the double-switched automatic sprinkler valve reaches designing goals and brings convenience and reliability to using.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An automatic sprinkler valve, comprising:
    a valve body having a water inlet and a water outlet inside;
    a valve lid having a first central hole, provided on said valve body and connected to said valve body;
    a valve cover having a second central hole at a top thereof, connected to said valve lid via a lower end of said valve cover;
    a piston barrel, provided inside said valve cover, passing through said first central hole;
    a magnetic core assembly, provided inside said piston barrel;
    a magnetic loop sheath, sleeved on said piston barrel;
    a magnetic loop assembly, provided inside said magnetic loop sheath;
    a movable rod having a third central hole in an upper part, wherein a lower end thereof is attached to said magnetic loop sheath and an upper end thereof passes through said second central hole;
    a memory alloy, sleeved on said movable rod, wherein a lower end of said memory alloy touches said valve cover;
    a heat concentrating cover which is connected to said movable rod and presses down said memory alloy; and
    a piston having a decompression hole and an aperture, provided on said water outlet and below said magnetic core assembly, wherein said aperture is communicated with said water inlet, in such a manner that, when temperature increases or decreases, said memory alloy expands or shrinks and correspondently said movable rod moves upwardly or downwardly, as well as said magnetic loop assembly and said magnetic core assembly inside said piston barrel under actions of magnetic forces, so as to open or block said decompression hole to further open or close said automatic sprinkler valve.

2. The automatic sprinkler valve, as recited in claim 1, further comprising a bias spring, sleeved on said movable rod to support between an internal top of said valve cover and an upper part of said magnetic loop sheath.

3. The automatic sprinkler valve, as recited in claim 1, wherein said second central hole of said valve cover is an internally prismatic hole and said movable rod is correspondently externally prismatic, for restricting said movable rod to only moving upwardly and downwardly through said second central hole.

4. The automatic sprinkler valve, as recited in claim 2, wherein said second central hole of said valve cover is an internally prismatic hole and said movable rod is correspondently externally prismatic, for restricting said movable rod to only moving upwardly and downwardly through said second central hole.

5. The automatic sprinkler valve, as recited in claim 1, further comprising a manual adjusting rod having an upper part passing through said third central hole and a bottom resisting against a top of said piston barrel, in such a manner that said memory alloy is further sleeved on said manual adjusting rod and said heat concentrating cover is connected to said manual adjusting rod.

6. The automatic sprinkler valve, as recited in claim 2, further comprising a manual adjusting rod having an upper part passing through said third central hole and a bottom resisting against a top of said piston barrel, in such a manner that said memory alloy is further sleeved on said manual adjusting rod and said heat concentrating cover is connected to said manual adjusting rod.

7. The automatic sprinkler valve, as recited in claim 3, further comprising a manual adjusting rod having an upper part passing through said third central hole and a bottom resisting against a top of said piston barrel, in such a manner that said memory alloy is further sleeved on said manual adjusting rod and said heat concentrating cover is connected to said manual adjusting rod.

8. The automatic sprinkler valve, as recited in claim 4, further comprising a manual adjusting rod having an upper part passing through said third central hole and a bottom resisting against a top of said piston barrel, in such a manner that said memory alloy is further sleeved on said manual adjusting rod and said heat concentrating cover is connected to said manual adjusting rod.

9. The automatic sprinkler valve, as recited in claim 5, wherein said third central hole and said manual adjusting rod have correspondent screw threads, in such a manner that said manual adjusting rod is only capable of being rotated down through said third central hole.

10. The automatic sprinkler valve, as recited in claim 6, wherein said third central hole and said manual adjusting rod have correspondent screw threads, in such a manner that said manual adjusting rod is only capable of being rotated down through said third central hole.

11. The automatic sprinkler valve, as recited in claim 7, wherein said third central hole and said manual adjusting rod have correspondent screw threads, in such a manner that said manual adjusting rod is only capable of being rotated down through said third central hole.

12. The automatic sprinkler valve, as recited in claim 8, wherein said third central hole and said manual adjusting rod have correspondent screw threads, in such a manner that said manual adjusting rod is only capable of being rotated down through said third central hole.

13. The automatic sprinkler valve, as recited in claim 9, wherein, by manually rotating said manual adjusting rod, said manual adjusting rod moves upwardly or downwardly to drive said movable rod, said magnetic loop assembly and said magnetic core assembly inside said piston barrel under actions of magnetic forces to move upwardly or downwardly, so as to open or block said decompression hole to further open or close said automatic sprinkler valve.

14. The automatic sprinkler valve, as recited in claim 10, wherein, by manually rotating said manual adjusting rod, said manual adjusting rod moves upwardly or downwardly to drive said movable rod, said magnetic loop assembly and said magnetic core assembly inside said piston barrel under actions of magnetic forces to move upwardly or downwardly, so as to open or block said decompression hole to further open or close said automatic sprinkler valve.

15. The automatic sprinkler valve, as recited in claim 11, wherein, by manually rotating said manual adjusting rod, said manual adjusting rod moves upwardly or downwardly to drive said movable rod, said magnetic loop assembly and said magnetic core assembly inside said piston barrel under actions of magnetic forces to move upwardly or downwardly, so as to open or block said decompression hole to further open or close said automatic sprinkler valve.

16. The automatic sprinkler valve, as recited in claim 12, wherein, by manually rotating said manual adjusting rod, said manual adjusting rod moves upwardly or downwardly to drive said movable rod, said magnetic loop assembly and said magnetic core assembly inside said piston barrel under actions of magnetic forces to move upwardly or downwardly, so as to open or block said decompression hole to further open or close said automatic sprinkler valve.

17. The automatic sprinkler valve, as recited in claim 1, further comprising a connecting bolt for connecting said valve body to said valve lid.

18. The automatic sprinkler valve, as recited in claim 1, wherein said magnetic loop assembly is formed by at least two magnets connected via identical polarities.

* * * * *